June 21, 1938.  M. LEMPEREUR ET AL  2,121,157
PRESELECTOR DEVICE FOR CONTROLLING SLIDING PINION GEAR BOXES
Filed March 7, 1935  6 Sheets-Sheet 1

INVENTORS
MAURICE LEMPEREUR
CHARLES VINCENT
BY
ATTY.

INVENTORS
MAURICE LEMPEREUR
CHARLES VINCENT
BY
ATTY.

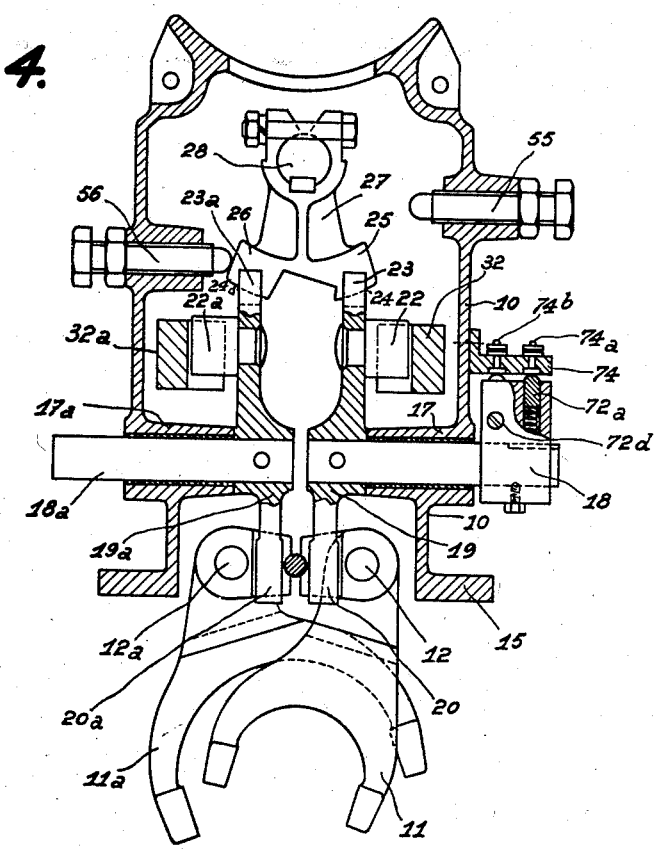
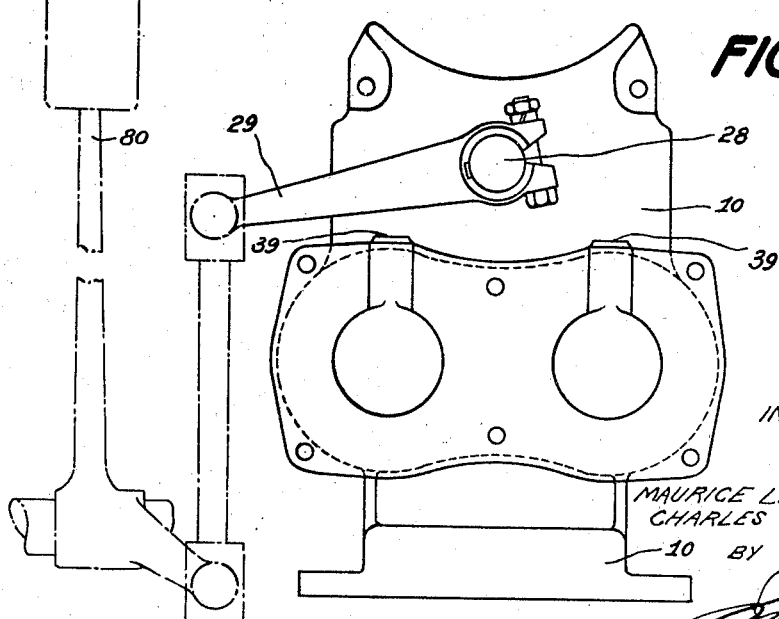

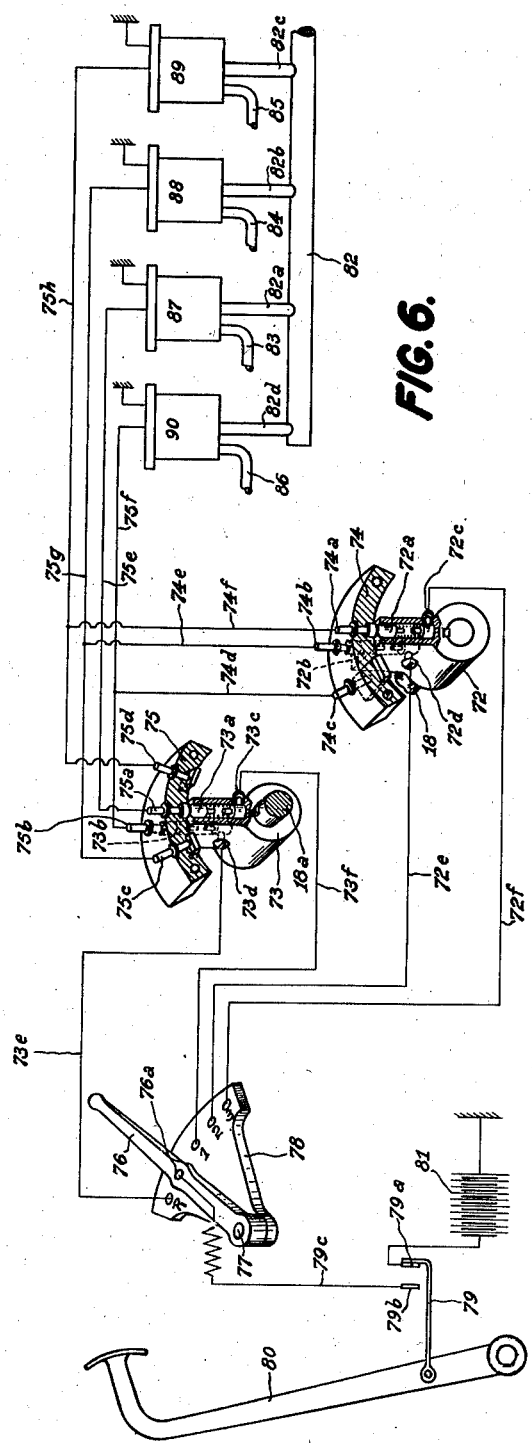
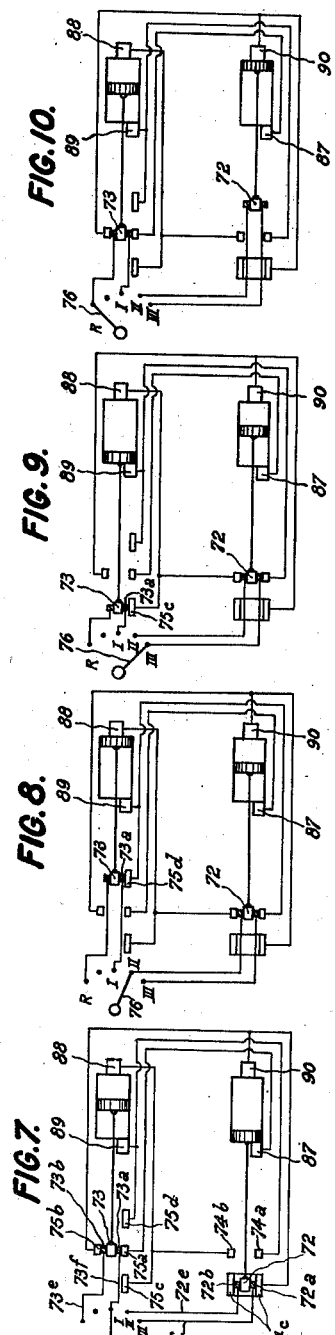

June 21, 1938.   M. LEMPEREUR ET AL   2,121,157
PRESELECTOR DEVICE FOR CONTROLLING SLIDING PINION GEAR BOXES
Filed March 7, 1935   6 Sheets-Sheet 5

INVENTORS
MAURICE LEMPEREUR
CHARLES VINCENT
BY
ATTY

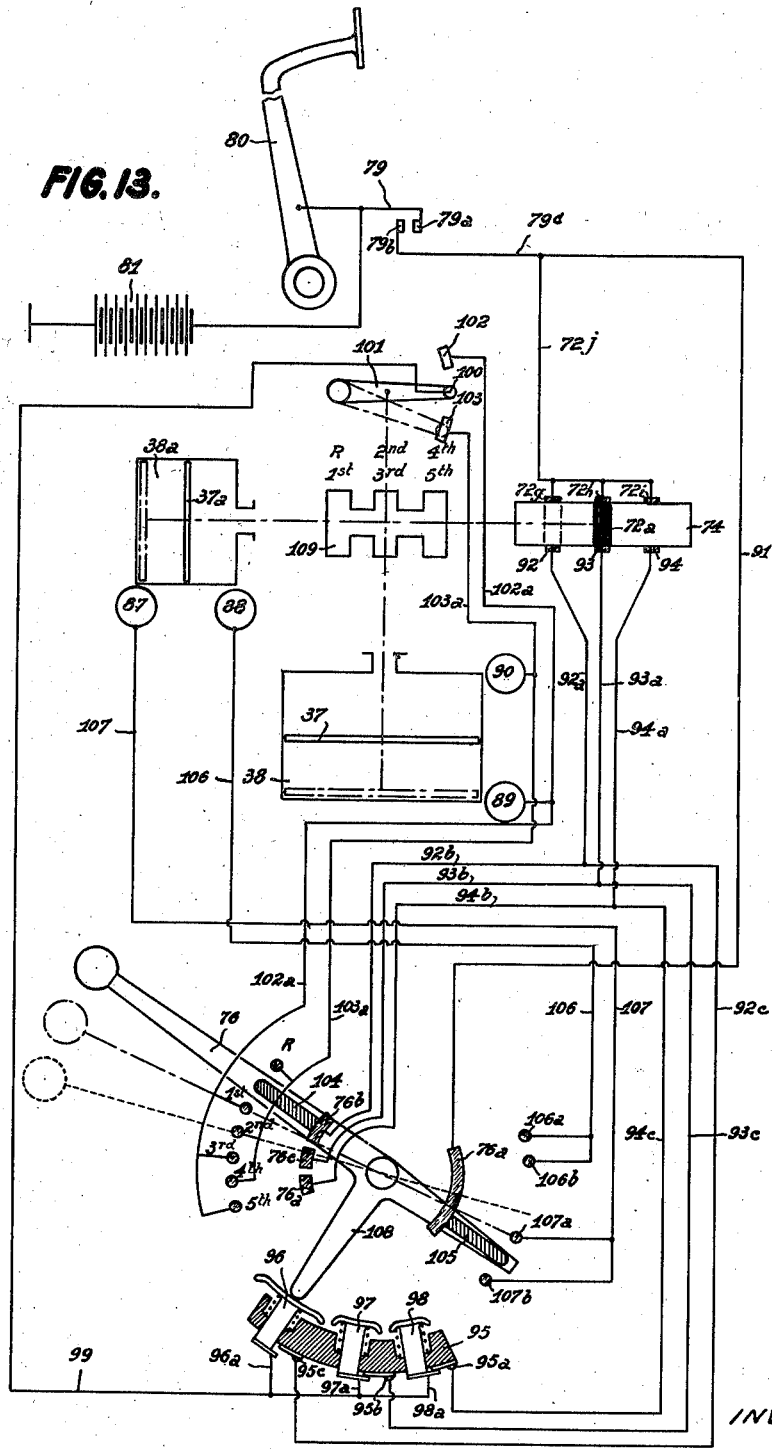

Patented June 21, 1938

2,121,157

UNITED STATES PATENT OFFICE 2,121,157

PRESELECTOR DEVICE FOR CONTROLLING SLIDING PINION GEAR BOXES

Maurice Lempereur and Charles Vincent, Brussels, Belgium, assignors to Bendix Aviation Corporation, South Bend, Ind., a corporation of Delaware Application March 7, 1935, Serial No. 9,854
In Belgium March 12, 1934

23 Claims. (Cl. 74—334)

The present invention relates to a device for pre-selecting the gear ratios in motor vehicles, and which is applicable to a change speed gear of the sliding pinion type.

So called pre-selection gear boxes are known in which the gear lever is replaced by a handle carried generally by the steering wheel and adapted according to its position to put the operative member controlling the engagement of the chosen speed into preliminary connection with the source of power which will operate so as to establish this speed when the clutch pedal is actuated.

The said pre-selector system has up to the present been fitted to gear boxes of a particular type.

The present invention has for its object to provide in a gear box of the so called sliding pinion type, i. e. a gear box in which the demultiplication for each speed is established by means of sliding elements, parallelly displaceable to themselves for individually establishing the connection between the driving and driven shafts by engagement of sets of pinions giving the desired speed, a combination of members by means of which it is possible with gear boxes of the known type, having two or more sliding pinions and by means of slight modifications of the said box to pre-select gear ratios, that is to say to prepare the engagement of the chosen speed by simply moving a handle, and to engage this speed positively at the chosen moment, by operating the clutch lever.

According to the invention, the mechanism controlling the striker rods of the gear box is actuated by a double acting pneumatic motor which may be put in communication with the source of fluid by means of a distributing valve actuated by a handle.

According to a modified form of construction of the invention, the pneumatic double acting motor actuating each striker rod is put into communication with the source of fluid by means of electromagnetic fluid valves controlled by a handle moving over an insulated quadrant or controller, provided with electrical contacts each corresponding to one of the gear ratios of the box.

One of the objects of the invention is to provide elastic neutralizing means acting in both directions of movement of the shifting members of the gear box, said means being destined, after disengagement of the sliding gears, to return each of said shifting members to its inactive or neutral position, and to maintain it in said position under a positive elastic tension.

Another object of the invention is to provide locking means controlled by the clutch pedal to prevent ill timed displacement of the sliding pinion and permitting to put under preliminary tension the operating fluid motor which will act to displace the sliding gear of the selected speed when the clutch pedal is actuated.

Another object of the invention is to provide reversing electric means controlled by movement of the sliding pinion operating mechanism so as to automatically and successively produce, after actuation of the clutch pedal, a momentary action of the power fluid to assist the action of the neutralizing elastic means in view of returning the sliding pinion gear to its neutral position, in the first place, and the action of the power fluid for engagement of the selected speed, in the second place.

Another object of the invention is to provide a device for pre-selecting gear ratios, applicable to a gear box comprising three striker rods.

Various embodiments of preferred forms of the invention are illustrated hereinafter simply by way of example and with reference to the accompanying drawings in which:—

Figure 4 is a cross-sectional view of the device shown in Figure 2.

Figure 5 is an end view looking in the direction of the arrows in Figure 2.

Figure 6 is a diagrammatic general arrangement view of a first form of construction of the invention in which the control for the sliding pinions of the gear box is obtained by means of an electro-pneumatic device.

Figures 7–10 are diagrammatic views showing the various electric circuits which are made in this device in the case of the 1st, 2nd, 3rd and reverse speeds respectively.

Figures 11 to 13 are diagrammatic views of a second embodiment of the invention which permits the various movements of the three sliding pinions of the gear box to be controlled by a main cylinder and an auxiliary cylinder.

In these figures, 10 is a member forming a support for the various constituent parts of the controlling device for the sliding pinions. This member is intended to replace the usual cover of the gear box upon which the change speed lever is generally pivoted by means of a ball joint.

Figure 3:
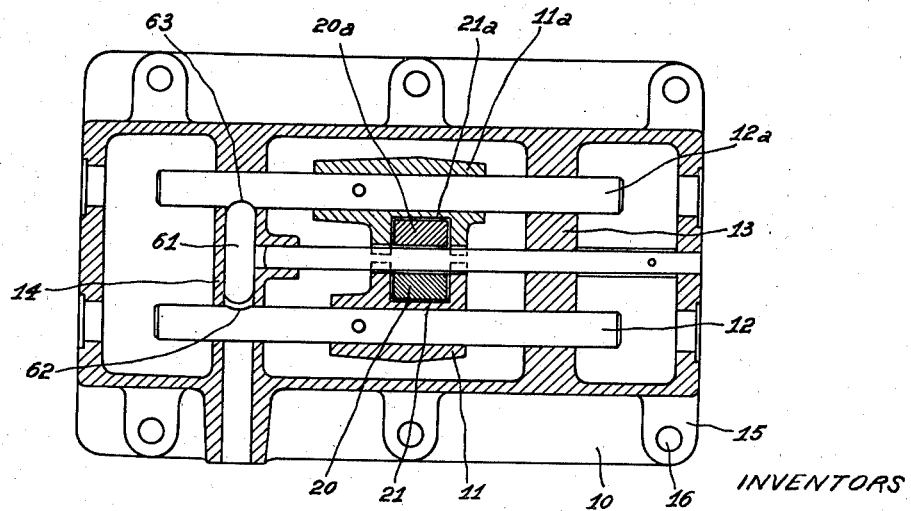
Figure 3 is a plan sectional view taken along the line 3—3 in Figure 2.

The sliding pinions are controlled by forks 11 and 11a (Figure 4) fixed to shafts 12 and 12a sliding in cross stays 13 and 14 (Figure 3) provided upon the said member 10, which also carries reinforcements 15 in which are formed holes 16 adapted to receive the attachment bolts by which the member 10 is secured upon the gear box.

Pivots 18 and 18a are journalled respectively at 17 and 17a. These pivots support oscillating levers 19 and 19a. The lower ends 20 and 20a of each of these levers engage in the lodgments 21 and 21a (Figure 3) provided upon the forks 11 and 11a.

Upon the levers 19 and 19a are secured near the upper part projections 22 and 22a adapted to control the displacements of the said levers, which terminate at their upper part in quadrants 23 and 23a, in each of which is formed near the centre a notch 24 adapted to be engaged by the two teeth 25 and 26 carried by a bolt 27 keyed upon a shaft 28 provided with a lever 29 (Figure 5) journalled in bearings 30 and 31 formed in the upper part of the member 10.

Adjustable stops 55 and 56 limit the distance through which the part 27 can move.

Figure 1:
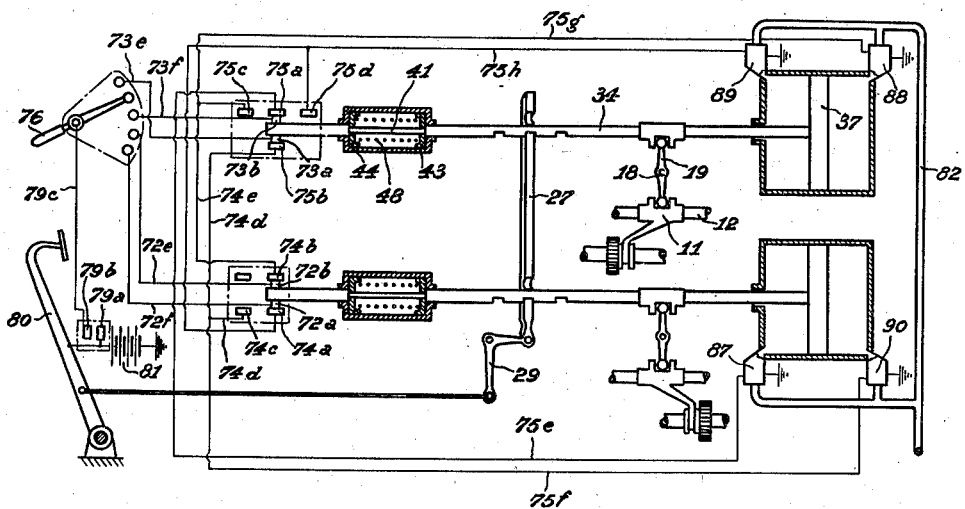
Fig. 1 is a diagrammatic view showing the application of the device to a gear box provided with two sliding pinions.
Figure 2:
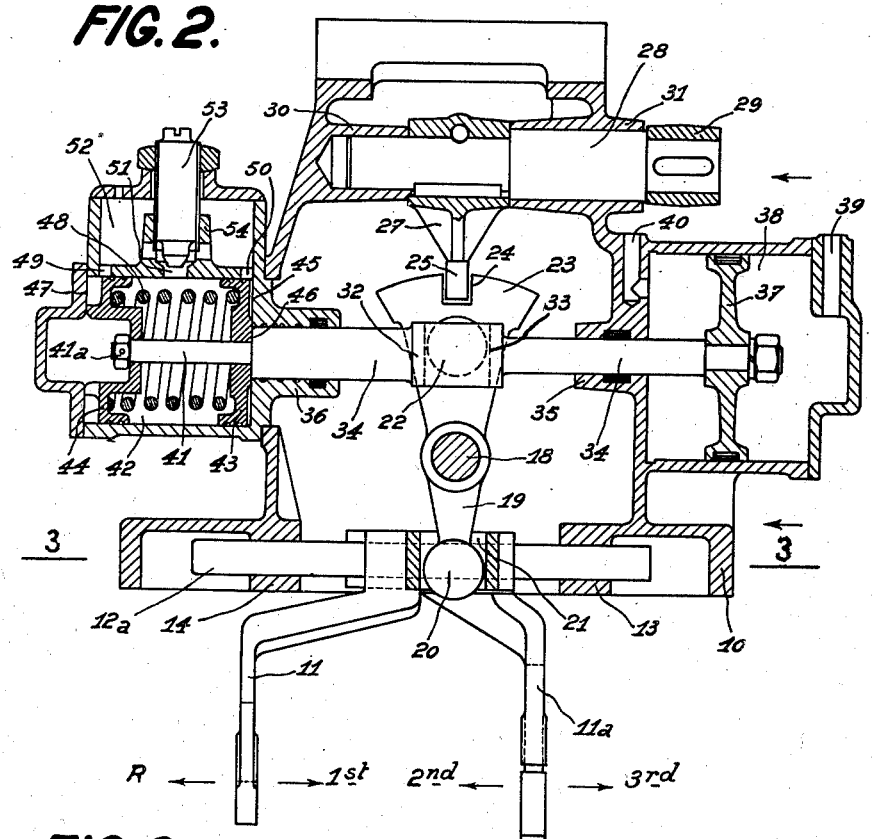
Figure 2 is a view in elevation and partial section of the device for controlling sliding pinions of a gear box of the well-known type.

Referring to Figure 2 it will be noted that each projection 22 engages the two opposite faces 32 and 33 of a notch formed near the middle of a shaft 34 sliding in bearings 35 and 36.

One of the ends of the shaft 34 carries a double acting piston 37 moving in a cylinder 38 rigid with the member 10 and communicating through apertures 39 and 40 with the vacuum distributor controlling the device.

The opposite end of the shaft 34 is extended by a portion 41 of smaller size engaging in a cylinder 42 filled with a suitable liquid, the portion or rod 41 carrying two pistons 43 and 44 sliding freely upon it.

The piston 43 normally abuts against the face 45 of the cylinder 42 and also against a shoulder 46 formed by the part of larger diameter on the shaft 34. The piston 44 normally abuts against the opposite face 47 of the cylinder 42 and against the abutment nut 41a provided on the end of the rod 41.

A spring 48 is provided between the two inner faces of the pistons 43 and 44 with a view to maintaining or returning the shaft 34 and the lever 19 and the mechanism controlled by the latter into their neutral position as shown in Figure 2.

The upper part of the cylinder 42 is provided with three apertures 49, 50 and 51 communicating with a reservoir 52 forming a compensation chamber for the liquid and situated above the cylinder 42. The section of passage of the aperture 51 may be regulated by means of a needle valve 53 screwing into a lateral projection 54 on the cylinder 42.

The operation of the pre-selection mechanism is as follows:—

When the engine of the vehicle is in motion and the driver wishes to engage reverse speed he moves the control handle of the distributor and places it in front of the indicator corresponding to the desired speed, thereby putting the induction pipe of the engine in communication, for example, with the duct 39 of the cylinder 38.

The piston is then acted upon by the vacuum, but cannot yet move in view of the fact that the bolt 29 engages by means of its tooth 25 in the notch on the lever 19.

When the moment has arrived to actuate the change of speed positively the driver will push the clutch pedal right out. This pedal is connected to the lever 29 either by means of pivoted levers or by a flexible connection with pulleys or similar guides, whereby the said lever is actuated, if desired against the action of a return spring. In its angular movement this lever produces the angular movement of the shaft 28 and the toothed sector 27, the teeth 25, 26 of which are thus disengaged from the notches 24. The right hand face of the piston 37 in Figure 2 is subjected to the action of the vacuum, while the left hand face is acted upon by atmospheric pressure so that the piston can then move towards the right and with it the shaft 34, which slides in its bearings 35 and 36, the rod 41 sliding in the piston 43 moving the piston 44, which is abutted against the nut 41a.

The volume of the chamber comprised between the inner faces of the pistons 43 and 44 becomes smaller and smaller, so that it compels a part of the liquid contained in this chamber to escape through the aperture 51, the size of which has been suitably calibrated by the needle valve 53, in order to regulate the speed of movement of the piston 44 and consequently of the shafts 34. In its movement the said shaft acts by means of the shoulder 32 upon the projection 22 on the lever 19, which in its angular movement about the pivot 18 moves by its end 20 the corresponding shoulder of the cavity 21 comprised by the fork 11 fixed upon the control shaft 12, thus also producing the displacement and engagement of the sliding pinion in the chosen gear ratio. In the meantime the driver has gradually released the clutch pedal and the locking quadrant 27 has locked the lever 19 and the whole of the mechanism by the engagement of the tooth 25 behind the radial end face of the notch 24 of the quadrant 23, and of the tooth 26 and of the notch 24a of the quadrant 23a.

If the driver wishes to stop the vehicle, he moves the handle of the distributor to the neutral position. That is to say, he cuts all communication between the vacuum duct and the power cylinders of the pre-selector device. The driver then pushes the clutch pedal right down, disengaging the bolt 27 from its action upon the lever 19, thereby permitting the shaft 34 to return into its neutral position under the action of the spring 48 acting upon the piston 44 which drives rapidly through the aperture 49 the liquid compressed between the outer face of the said piston and the end of the cylinder of the dashpot. The release of the clutch pedal again locks the levers 19, 19a.

Naturally, if the distributor is put into communication with the chamber of the power member, situated on the left of the piston 37, through the aperture 40, the same operation will be reproduced in the device but in the opposite direction to that described above.

It is to be noted that the particular arrangement of the spring 48 provided between the pistons 43 and 44, permits the control mechanism of the sliding pinions to be returned into an unvarying neutral position and the said mechanism to be maintained in this position under a force of constant tension.

Further, it is to be noted that the device described above and illustrated in the drawings, permits two different speed ratios to be controlled by means of a single power motor with automatic return of the sliding pinions into their strictly neutral position.

When it is necessary in order to produce a change of speed ratio, to pass from one sliding pinion control shaft to the other, it will be understood that as soon as the clutch pedal is actuated, with the disengagement of the locking mechanism 27 as the first sliding pinion is no longer acted upon by the power member, the mechanism will be returned automatically to the neutral point, while the second sliding pinion will be displaced by the power member of the chosen speed ratio.

In order to avoid the possibility of one of the two sliding pinions being moved before the other has taken up its neutral position again the invention provides for the application of an auxiliary bolt 61 adapted to be engaged in notches 62 and 63 formed respectively in the control shafts of the sliding pinions 12 and 12a.

If the vehicle is provided with an automatic clutch actuated by a vacuum motor controlled by the position of the accelerator pedal, the operation of changing speed ratios and the unlocking of the sliding pinion controlling shafts may be effected automatically after the pre-selector handle has been moved by simply releasing the said accelerator pedal without any operation of the clutch pedal.

According to a modified form of the device the invention provides an electrical control for the pneumatic power members adapted to engage the speed ratios.

In this modification, in order to change from one speed to the other, the pneumatic power member corresponding to the speed ratio to be engaged, is not put into communication with the source of power until after a certain travel of the clutch pedal. The disengagement of the sliding pinion of the speed ratio in engagement is effected under the action of the neutralizing spring aided by the pneumatic action.

This arrangement is formed for example by the general arrangement shown in Figure 6, for the three speed and reverse gear box described with reference to Figs. 1–5.

Upon the ends of the shafts 18 and 18a are keyed two sliders 72 and 73 made of insulating material, each comprising two brushes 72a and 72b, 73a and 73b.

A current is supplied to these brushes through cables attached to the screws 72c and 72d, 73c and 73d. These brushes slide upon quadrants 74 and 75, also made of insulating material, and attached to the casing 10.

The quadrant 74 comprises contacts 74a, 74b and 74c, while the quadrant 75 comprises contacts 75a, 75b, 75c and 75d.

The control handle 76, which is secured for example to the steering column near the driver's hand, pivots about a fixed axis 77, forming part of a quadrant 78, comprising five different positions for the handle corresponding respectively to reverse, neutral (position shown in the drawings) and to first, second and third speeds.

For each of these positions there is provided upon the quadrant 78 an insulated contact corresponding to each of the three speeds and reverse, while upon the control handle 76 is provided an insulated contact 76a.

With a view to cutting off the current during the motion of the vehicle, a switch 79 has been connected in the electric circuit. This switch is controlled by the clutch pedal 80 which only allows the current to pass when this pedal 80 is actuated to a certain extent.

The electrical circuit is thus established as follows:

The battery of accumulators 81 is connected on the one hand to the frame and on the other hand to the terminal 79a of the switch 79. The other terminal 79b is connected to the contact 76a of the handle 76 by means of the cable 79c.

The contact R of the quadrant 78 of the control is connected by the cable 73e to the screw 73d of the slider 73. The contact for the first speed on the sector 78 is connected by the cable 73f to the screw 73c of the slider 73 which pivots with the operating lever 19 for the sliding pinion for second and third speeds.

The second speed contact of the sector 78 is connected by the cable 72e to the screw 72d of the slider 72 and the third speed contact is connected to the screw 72c by the cable 72f. The slider 72 moves with the first speed and reverse sliding pinions.

The terminal 75a of the sector 75 is connected to the first speed electro-pneumatic distributor 87 by the cable 75e.

The terminal 75b of the sector 75 is connected on the one hand to the reverse electro-pneumatic distributor 90 by the cable 75f and on the other hand to the terminal 74c of the quadrant 74 by the cable 74d.

The terminal 75c of the quadrant 75 is connected on the one hand to the second speed electro-pneumatic distributor 88 by the cable 75g and on the other hand to the terminal 74b of the quadrant 74 by means of the cable 74e.

The terminal 75d of the sector 75 is connected on the one hand to the third speed electro-pneumatic distributor 89 by means of the cable 75h and on the other hand to the terminal 74a of the quadrant 74 by the cable 74f.

The electro-pneumatic distributors 87–90 are connected on the other side to the frame.

The main inlet duct 82 of the source of power is connected to each of the distributors by means of the ducts 82a, 82b, 82c, 82d. Further, the distributors are connected to their corresponding cylinder by means of pipes 83, 84, 85 and 86.

The device operates in the following manner:—
It must be considered as stated above that the position of the various members illustrated in the general diagram shown in Figure 6 corresponds to the neutral position, that is to say that none of the gear ratios is engaged.

If it is desired to engage first speed, the handle 76 is placed in the position corresponding to this speed. The electric circuit is then completed by the cable 79c, the contact 76a, the first speed contact of the quadrant 78, the cable 73f, the screw 73c, the brush 73a, the terminal 75a, the cable 75e, in order to reach the electromagnet of the first speed distributor 87. After this operation the current is not yet fed through the circuit. It will be necessary to depress the clutch pedal 80 by a certain amount in order to establish the contact between the terminals 79a and 79b of the switch 79. At this moment the valve of the distributor 87 for the first speed will open so as to put the cylinder of the corresponding power member related to the operation of the striker rod 12 of the first speed into communication with the main duct 82 by means of the ducts 83 and 82a.

The diagram shown in Figure 7 illustrates the position of the brushes of the sliders 72 and 73 with respect to the different contacts of their corresponding sector 74 or 75 when first speed is engaged.

In order to change to second speed, the striker rod 12a must be put into action while the striker rod 12 must be returned to the neutral position. As shown in the diagram illustrated in Figure 7, the slider 72 connected to the striker rod 12 of the first speed is situated with its brushes 72a, 72b in contact with the enlarged contact 74c.

The speed selecting handle 76 is placed upon the second speed contact of the quadrant 78 so that the circuit is made through the cable 72e, the screw 72d, the contact 74c and the cables 74d and 75f in order to reach finally the reverse distributor 90 the power member of which is connected to the common striker rod of the reverse and first speeds and will act so as to disengage the latter.

For this purpose as soon as the clutch pedal 80 is actuated the current will flow in the above-mentioned circuit and the cylinder of the power member corresponding to reverse travel will be put in communication with the general vacuum duct 82 through the ducts 86 and 82d. The piston of the power member subjected to the action of the vacuum will act conjointly with the force developed by the neutralizing spring 48 in order to disengage the first speed and return the striker rod 12 into its neutral position.

The action of the vacuum upon the piston, which is adapted particularly to liberate the pinions which are in engagement will only be exerted during a fraction of the stroke of the sliding pinion and will cease as soon as the brush 72b has left the contact 74c. The length of the contact 74c may be made such that the action of the power source will cease after a predetermined length of time. As soon as the slider 72 has returned into its position corresponding to the neutral position of the sliding pinion, the handle 76 remaining upon the second speed contact, the electric circuit will then be made through the cable 72e, the screw 72d, the contact 74b, the cables 74e and 75g in order to reach the second speed electric pneumatic distributor 88. After this the main duct 82 will be put into communication through the ducts 84 and 82d with the cylinder of the power member corresponding to the entry into action of second speed, Figure 8 shows the position of the brushes of the slider 73 relative to the contacts of the quadrant 75 after the engagement of second speed.

In order to pass from second to third speed, the change is made directly, as these two speeds are controlled by the same sliding pinion, the current passing through cable 72f, brush 72a, contact 74a and cables 74f and 75h.

It will be noted in Figure 8 that the brush 73a is already in contact with the contact 75d connected to the distributor 89 of the third speed, so that in order to pass from second to third speed it will be sufficient to put the handle 76 in contact with the contact of the quadrant 78 corresponding to the said third speed and to actuate the clutch pedal.

Figures 9 and 10 show the position of the movable contacts relative to the fixed contacts of the electric circuits corresponding to third speed and reverse which are made when these speeds are engaged.

This device thus permits, in a pre-selector change speed gear having two sliding pinions and an electro-pneumatic control, a change to be made from one of the sliding pinions to the other without the power effort ever being able to become established at the same time in two power members of these sliding pinions, while one of the latter will always be returned to the neutral position before the other is acted upon by the source of vacuum.

According to a second embodiment the electro-pneumatic control device is applied to a gear box having three sliding pinions.

In this modification, the piston 37 (Figs. 11 to 14) of the double acting pneumatic motor cylinder 38, controls the oscillation of the lever 19. Said lever is fixed to the shaft 18 which may be displaced laterally and transversally in respect to the axes of the striker rods 69—70 and 71 under the action of the piston 37a of the double acting motor cylinder 38a.

Due to the well determined working positions taken by the piston 37a when displaced by pneumatic fluid or when submitted to the action of the neutralizing device, according to the invention, it will be understood that the positions for engagement of said oscillating lever with either of the lodgement provided on the striker forks 11, 11a, 11b will be exactly determined by the stroke of the piston 37a and by the stops of said neutralizing device.

Figure 14:
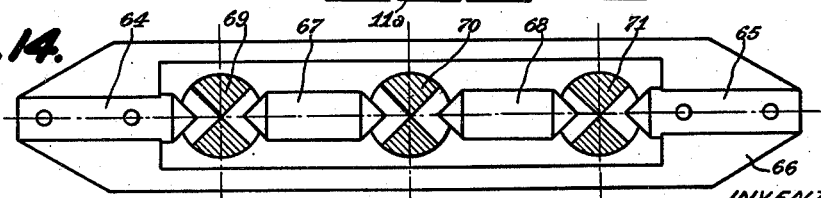
Figure 14 is a detail view of the locking system between three sliding pinion shafts.

The control of the device is the same in this case as the control of the two striker rods gear box. The two pistons 37 and 37a are always urged towards their neutral position by the spring 48 in the case of the piston 37, and the spring 48a in the case of the piston 37a. The main locking bolt 27 is connected to the clutch pedal and controls the longitudinal displacements of the sliding pinions and consequently the engagement and disengagement of the speed ratios. The auxiliary locking device provided to prevent the simultaneous displacement of several striker rods applied to a three striker rods gear box comprise in this case two end bolts 64 and 65 rigid with a movable grille 66, the end bolts 64 and 65 acting conjointly with auxiliary bolts 67 and 68 in order to lock or release the shafts 69, 70 and 71 provided with their respective locking notches (Fig. 14).

It is necessary that by a single operation of the pre-selector handle the lever 19 moving the sliding pinions can be placed opposite the sliding pinion corresponding to the pre-selected speed before the piston 37 exerts its action upon this sliding pinion. This operation is effected by the piston 37a which, in moving, carries with it a lever 72, the upper part of which is formed of insulating material. This lever comprises a brush 72a which becomes placed alternatively upon one of the contacts 74a, 74b, 74c, provided upon a fixed quadrant 74 made of an insulating material. The electric current is fed to the brush 72a through the screw 72c. The electrical control for a gear box having three sliding pinions, that is to say, 5-speed ratios forward and one reverse, is obtained by way of example by means of the general diagrammatic arrangement shown in Figure 13.

The electrical connections are established as follows:

The battery 81 is connected to the terminal 79a of the switch 79. The other terminal 79b is connected on the one hand to each of the contacts 72g, 72h, 72i of the quadrant 74 by the cable 72j and on the other hand by the cable 91 to the contact 76a of the pre-selector controller.

The contacts 92, 93 and 94 of the quadrant 74 are connected by the cables 92a, 93a and 94a on the one hand to the contacts 76b, 78c and 76d by the cables 82b, 93b, 94b and on the other hand by the cables 92c, 93c, 94c to the contacts 95c, 95b, 95a of the fixed quadrant 95 made of an insulating material. This quadrant 95 carries sliding switches 96, 97 and 98 connected by the cables 96a, 97a and 98a to the cable 99 connected to the contact 100 of the reversing lever 101 connected to the piston 37. The contact 100 of the reversing lever 101 controlled by the displacements of the piston 37 may be put alternatively into contact with the contacts 102 and 103 connected respectively by the cables 102a and 103a on the one hand to the distributors 89 and 90 and on the other hand to the contacts of the first, third and fifth speeds and to the contacts of the reverse, second and fourth speeds. The electro-pneumatic distributor 88 of the cylinder 38a is connected by the cable 106 to the contacts 106a and 106b of the pre-selector controller. The electro-pneumatic distributor 87 is connected by the cable 107 to contacts 107a and 107b of the pre-selector controller. The piston 37a controlling the lateral movements of the lever 19 is connected to a brush 72a. The position of the various parts illustrated in Figure 13 corresponds to the neutral position of the speed ratios. The electro-pneumatic distributors 87—90 are connected at their other sides to the frame.

The operation is as follows:—

In order to engage first speed, the control handle 76 is placed in the position corresponding to this speed. In this position, the finger 108 of the handle 76 holds the contact 96 raised so as to interrupt the current between this contact and the terminal 95c. The contact blade 105 establishes the current between the contact 76a and the contact 107a. The circuit is then made between the terminal 79b of the switch 79 by the cables 79c and 91, the contact 76a, the blade 105, the contact 107a, the cable 107, in order to reach the distributor 87 of the cylinder 38a.

As soon as the clutch pedal 80 is lowered the current will flow in this circuit and the distributor 87 will put the chamber of the cylinder 38a situated on the left of the piston 37a into communication with the partial vacuum. Thereupon, the piston 37a will move towards the left and will carry with it the lever 19 (Fig. 12) and the brush 72a. The lever 19 will be situated opposite the groove in the grille 109 corresponding to the first speed. Similarly, the brush 72a will be opposite the contacts 72g and 92. At this moment, the current will pass through the cable 72j, the contact 72g, the brush 72a, the contact 92, the cables 92a, 92b, the contact 76b, the blade 104, the first speed contact, the cable 102a, in order to reach the distributor 89 of the cylinder 38. The partial vacuum will then be established upon the lower face of the piston 37 which will move the lever 19, thereby engaging first speed. The reversing lever 101 will have become placed in a position such that the contact 100 will be in contact with the contact 103 (position of these parts indicated in dot and dash lines in Figure 13).

If it is desired to change into second speed, that is to say a speed corresponding to a sliding pinion different from that of the first speed, the present device provides, in addition to the neutralizing spring, for the action of the fluid to return the sliding pinion which is engaged, into the neutral position.

Figure 11:
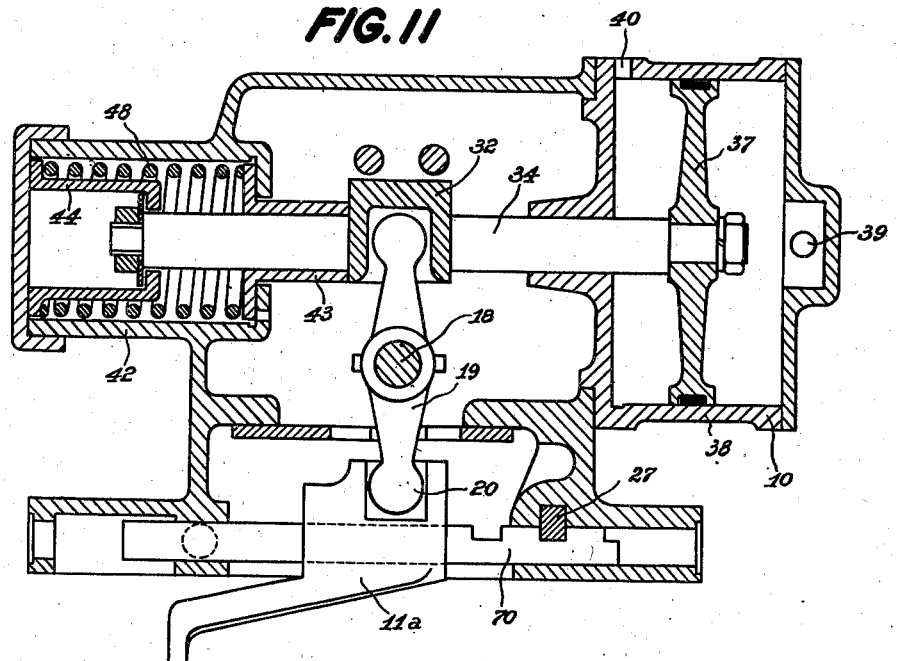
Figure 12:
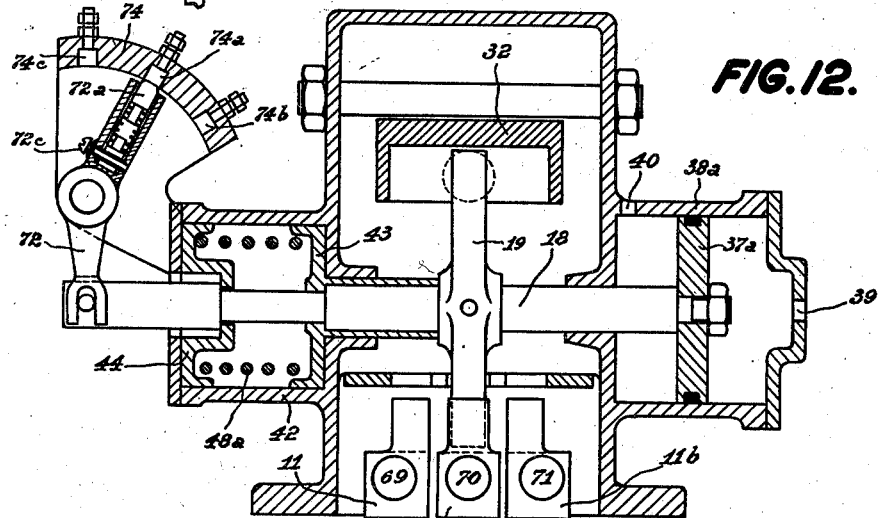

The handle 76 being placed in the position corresponding to second speed, the finger 108 leaving the contact 96 will raise the contact 97 cutting off the current between this contact and the terminal 95b. The current reaching the contact 76a and the blade 105 through the cables 79c and 91 will be cut off at the end of the blade 105. Consequently the distributor 87 will put the left-hand chamber of the cylinder 38a into communication with the atmosphere. As soon as the clutch pedal 80 is depressed, the current will be established through the cables 79c, 72j, the contact 72g, the brush 72a, the contact 92, the cables 92a, 92c the terminal 95c, the contact 96, the cables 96a and 99, the contact 100 of the reversing lever 101, the contact 103, the cable 103a, in order to reach the distributor 90 which has the effect of putting the upper chamber of the cylinder 38 into communication with partial vacuum. This partial vacuum will act upon the piston 37 with the neutralizing spring 48 in order to disengage the first speed. This partial vacuum will act until the moment when the contact 100 of the reversing lever 101 will have left the contact 103. The first speed sliding pinion having been returned into the neutral position, the neutralizing spring 48a will return the lever 19 towards the right and the brush 72a will take up again the position shown in Figure 13. At this moment the current will pass through the cables 79c and 72j, the contact 72h, the brush 72a, the contact 93, and cables 93a and 93b, the contact 76c, the contact blade 104, the second speed contact, the cable 103a, in order to reach the distributor 90. The latter will again put the upper chamber of the cylinder 38 into communication with the partial vacuum and the piston 37 will engage the second speed by pushing the reversing lever 101 upwards so that the contact 100 will be in contact with the contact 102. By releasing the clutch pedal, the speed will be locked by means of the bolt 27 (Figure 11).

It will be seen that from the diagram this operation will be repeated for each change of speed ratio, that is to say, that the pneumatic action will operate conjointly with the neutralizing spring in order to disengage each of the speed ratios and return the sliding pinion to the neutral position. The action of the partial vacuum adapted in particular to liberate the pinions, as described for the device comprising two sliding pinions, is only exerted during the time that the contact 100 of the reversing lever 101 is in contact with one of the contacts 102 or 103. By this arrangement the current will only be established in the distributors controlling the chambers of the cylinder 38, the piston 37 of which controls the movements of the sliding pinions, when the lever 19 has returned to the neutral position and is opposite the groove corresponding to the speed which will have been pre-selected.

Finally, it is clearly understood that the devices that have been described and illustrated in their application to the upper part of a gear box of known type may without going outside the scope of the invention be provided in any other position which may be considered suitable for convenience in mounting.

For example, the power members and shock absorbing members may be situated laterally with respect to the gear box, at one of its ends and if desired combined with this box.

What I claim is:

1. In a device for pre-selecting gear ratios in gear boxes of the sliding pinion type for automobile vehicles, the combination with the striker rods and sliding pinions, and a pedal actuating the clutch device, of a plurality of shifting members for controlling said sliding pinions, double acting, fluid motors for actuating said shifting members, electro-magnetic valves for controlling the fluid admitted into said fluid motors, a manually operable electric controller for said valves comprising fixed contacts for each shifting position, a movable contact adapted to engage any one of said fixed contacts, elastic means acting in either direction of displacement of said shifting members to return the latter in neutral position and to maintain them under a positive elastic tension, reversing electric means controlled by the displacement of the shifting members, locking means for said shifting members controlled by the clutch pedal, locking means independent from said first locking means to prevent a simultaneous movement of two striker rods, a source of current, and a switch actuated by the clutch pedal, to connect said source of current to the electric circuit when said pedal is actuated.

2. In a device for pre-selecting gear ratios in gear boxes of the sliding pinion type for automobile vehicles, the combination with the striker rods and sliding pinions, of a plurality of shifting members for controlling said sliding pinions, double acting pneumatic fluid motors for actuating said shifting members, two electro-magnetic valves on each motor, said valves controlling the admission of pneumatic fluid into said motors, a manually operable electric controller for said electro-magnetic valves, insulated contacts on said controller corresponding to the shifting positions of the gears, a movable contact adapted to engage anyone of said fixed contacts, elastic means acting in either direction of displacement of the shifting members to return the latter to the neutral position and to maintain them in said position under a positive elastic tension, a clutch pedal, locking means for the shifting members controlled by said clutch pedal, a source of current, a switch actuated by said clutch pedal to connect said source of current to the electric circuit when said pedal is actuated, reversing switches in the electric circuit comprising each a fixed insulated sector provided with electric contacts, rubbing contacts or brushes moving integrally with the shifting members and acting upon the said fixed sector contacts to establish successively and automatically the circuit of the electro-magnetic valve of the motor which will act to assist the neutralizing spring to disengage the shifted gear and being to the neutral position in the first place and the circuit of the electro-magnetic valve of the motor which will act to engage the speed selected by the manual controller, in the second place.

3. In a device for pre-selecting gear ratios in gear boxes of the sliding pinion type for automobile vehicles, the combination with the gear box mechanism, of three striker rods for operating the sliding gears, a shaft provided transversally to the axes of the striker rods and above the latter, a first double acting pneumatic motor cylinder, a piston in said cylinder, a driving connection between said piston and said shaft, an oscillating lever fixed on said shaft adapted to engage by one of its ends, according to the position of the piston of said first motor cylinder, anyone of said striker rods, a second double acting pneumatic motor cylinder, a piston in the latter, a rod connected to the said second piston, means actuated by the displacement of said piston rod to impart an angular movement to said oscillating lever in order to longitudinally displace the striker rods in either direction, electro-magnetic valves controlling the pneumatic fluid admitted into said motor cylinders, a manually operable electric controller for said valves, elastic means acting in either direction of displacement of first and second pistons to return the latter to their neutral position and to maintain them in said position under a positive elastic tension, reversing electric means controlled by the displacements of said pistons, a clutch pedal, locking means for the striker rods controlled by said clutch pedal, locking means independent from said first locking means to prevent a simultaneous movement of two striker rods, a source of current, and a switch actuated by the clutch pedal, to connect said source of current to the electric circuit when said pedal is actuated.

4. In an automotive vehicle provided with a gear changing transmission including shifter rails and means movable laterally and longitudinally for respectively selecting and operating said rails, power means of the pre-selective type for operating said means either to neutralize the transmission or to select and establish any one of its gear relations, said power means including a manually operable control member, and further including means operable, subsequent to a selecting operation of said control member, to insure a neutralization of said transmission and thereafter a selecting movement of said first-mentioned means, and means operable by movement of said first-mentioned means upon completion of the said selecting movement for causing gear-establishing operation of said power means.

5. In an automotive vehicle provided with a gear-changing transmission including shifter rails and means for selecting and subsequently operating said rails, pressure differential operated and electrically controlled power means of the pre-selective type for operating said means either to neutralize the transmission or to select and establish any one of its gear relations, said power means including a manually operable control member, and further including means normally biasing said power means to select the shifter rail controlling second and high gear establishment of the transmission, and also including means operable, subsequent to a selecting operation of said control member, to insure a neutralization of said transmission and a selecting operation of said first-mentioned means prior to a gear establishing operation of said power means.

6. In an automotive vehicle provided with a variable-speed transmission including two shifter rails and means for selecting and subsequently operating one or the other of said rails to establish a desired gear relation, power means of the pre-selective type for operating said means in a conventional manner, said power means including a power unit comprising a plurality of motors, valvular means for controlling said motors, and electrical means for operating said valvular means, said electrical means including a manually operable selector switch means, said electrical means further including means operable to initiate a neutralization of said transmission by said power means and thereafter a selecting movement of said first-mentioned means, and means operable by movement of said first-mentioned means upon completion of the said selecting movement for causing gear-establishing operation of said power means.

7. In an automotive vehicle provided with a variable-speed transmission including two shifter rails and means for selecting and subsequently operating one or the other of said rails to establish a desired gear relation, power means of the pre-selective type for operating said means in a conventional manner, said power means including two pressure differential operated motors, one operable to effect the selecting operation of said first-mentioned means and the other operable to effect the gear establishing operation of said means, means normally biasing said selecting power means to select the shifter rail controlling second and high gear establishment, valvular means for controlling said motors, and electrical means for operating said valvular means, said electrical means including a manually operable selector switch means, and further including means operable to initiate a neutralization of said transmission by said power means and to insure a selecting operation of said first-mentioned means prior to a gear establishing operation of said power means.

8. In an automotive vehicle provided with a selective gear-shifting transmission, power means for operating said transmission, and electrical control means for said power means including a manually operable selector switch, and further including other switch means so interlocked with said manually operable selector switch as to initiate a neutralization of said transmission by said power means and thereafter a selecting operation thereof, and means operable during said last-named selecting operation for causing gear-establishing operation of the power means.

9. In an automotive vehicle provided with a selective gear-shifting transmission, power means for operating said transmission, said power means including means biasing the same to select the second and high gear ratio, said power means further including electrical control means for said power means including a manually operable selector switch, and further including two separate power operated selector switches so interlocked with said manually operable selector switch as to initiate a neutralization of said transmission by said power means and to insure a selecting operation thereof prior to a gear establishing operation of the power means.

10. In a power operated gear shifting mechanism for the change-speed transmission of an automotive vehicle, said transmission including two shift rails, and means operative to first interlock with one of said rails and then actuate the same to establish a gear relation, power means for successively moving said first means laterally then longitudinally, or vice versa, to effect the aforementioned operations, and means for controlling the operation of said power means comprising a manually operable selector unit, a selector unit rendered operable with the longitudinal operation of said first-mentioned means and another selector unit rendered operable with the lateral operation of said first-mentioned means.

11. In a power operated gear shifting mechanism for the change-speed transmission of an automotive vehicle, said transmission including two shift rails and a lever operable to first interlock with one of said rails and then actuate the same to establish a gear relation, power means for successively moving said lever laterally then longitudinally, or vice versa, to effect the aforementioned operations, said power means including a motor for operating said lever laterally and a motor for operating said lever longitudinally, and means for controlling the operation of said power means comprising a manually operable selector unit, a selector unit rendered operable with the longitudinal operation of said first-mentioned means and another selector unit rendered operable with the lateral operation of said first-mentioned means.

12. In a power operating gear shifting mechanism for the change-speed transmission of an automotive vehicle, said transmission including two shift rails and a lever operative first to interlock with one of said rails and then actuate the same to establish a gear relation, power means for successively moving said lever laterally then longitudinally, or vice versa, to effect the aforementioned operations, said power means including a motor for operating said lever laterally and a motor for operating said lever longitudinally, and means for controlling the operation of said power means comprising a plurality of valve units, and electrical means for operating said valves comprising a manually operable selector switch, a selector switch rendered operable with the longitudinal operation of said lever means, and another selector switch rendered operable with the lateral operation of said lever means.

13. A power-operated control mechanism for a transmission gearing of the type having a combined selector and shifter member movable to select and shiftable to establish a desired gear relation comprising power means for effecting selecting movement of said member, a separate power means for effecting shifting movement of said member, a manually-operable member for controlling the flow of energy directly to said first named power means, and valvular means operated by said first named power means for controlling the flow of energy directly to said second named power means.

14. A power-operated control mechanism for a transmission gearing of the type having a combined selector and shifter member movable to select and shiftable to establish a desired gear relation comprising fluid power means for effecting selecting movement of said member, a separate fluid power means for effecting shifting movement of said member, manually-operable means for controlling the flow of fluid pressure directly to said first named power means, and valve means operated by said first named power means for controlling the flow of fluid pressure directly to said second named power means.

15. A power-operated control mechanism for a transmission gearing of the type having a combined selector and shifter member movable to select one of a pair of shifter bars and shiftable with the selected bar to establish a desired gear relation comprising a double-acting fluid-operated motor including a cylinder and piston, means for operatively connecting said piston and member, resilient means associated with said motor and normally maintaining said piston in centered position whereby said member will be positioned between said bars, manually-operable means for selectively controlling the flow of fluid pressure to either end of said cylinder to effect selection of one or the other of said shifter bars, a separate fluid-operated motor for shifting said member and the selected bar to establish the desired gear relation, and means rendered operable by movement of said piston for controlling the flow of fluid pressure to said separate motor.

16. A power-operated control mechanism for a transmission gearing of the type having a combined selector and shifter member movable to select and shiftable to establish a desired gear relation comprising power means for effecting selecting movement of said member, a separate power means for effecting shifting movement of said member, manually-operable control means for controlling the flow of energy to said first named power means, and means positioned exteriorly of said first named power means and actuated by movement of the latter for controlling the flow of energy to said second named power means.

17. A power-operated control mechanism for a transmission gearing of the type having a combined selector and shifter member movable to select and shiftable to establish a desired gear relation comprising power means for effecting selecting movement of said member, manually-operable means for controlling the flow of energy to said power means, and means separate from said power means and controlled by operation of the latter for effecting shifting movement of said member.

18. A power-operated control mechanism for a transmission gearing of the type having a combined selector and shifter member movable to select and shiftable to establish a desired gear relation comprising power means for effecting selecting movement of said member, a separate power means for effecting shifting movement of said member, a manually-operable member for controlling the flow of energy to said first named power means, and valvular means separate from said first named power means and operable by movement of said first named power means for controlling the flow of energy to said second named power means.

19. A power-operated control mechanism for a transmission gearing of the type having a combined selector and shifter member movable to select and shiftable to establish a desired gear relation comprising fluid power means for effecting selecting movement of said member, a separate fluid power means for effecting shifting movement of said member, manually-operable means for controlling the flow of fluid pressure to said first named power means, and valve means positioned exteriorly of and operable upon movement of said first named power means for controlling the flow of fluid pressure to said second named power means.

20. A power-operated control mechanism for a transmission gearing of the type having a combined selector and shifter member movable to select one of a pair of shifter bars and shiftable with the selected bar to establish a desired gear relation comprising a double-acting fluid-operated motor including a cylinder and piston, means for operatively connecting said piston and member, resilient means associated with said motor and normally maintaining said piston in centered position whereby said member will be positioned between said bars, manually-operable means for selectively controlling the flow of fluid pressure to either end of said cylinder to effect selection of one or the other of said shifter bars, a separate fluid-operated motor for shifting said member and the selected bar to establish the desired gear relation, and valvular mechanisms operable by said piston at opposite ends of its stroke for controlling the flow of fluid pressure to said separate motor.

21. In a control mechanism for a power-operated gear shifting device having a member movable to select and shiftable to establish a desired gear relation, a double-acting fluid actuator including a pressure-responsive member for moving said member in opposite directions, means for selectively controlling the admission of fluid pressure to either end of said actuator, a second fluid actuator for shifting said member, a plurality of valve mechanisms for controlling the flow of fluid to said second actuator, and means movable by said pressure-responsive member for selectively operating said valve mechanisms.

22. In a power operating gear shifting mechanism for the change-speed transmission of an automotive vehicle, said transmission including two shift rails and a lever operative first to interlock with one of said rails and then actuate the same to establish a gear relation, power means for successively moving said lever laterally then longitudinally, or vice versa, to effect the aforementioned operations, said power means including a motor for operating said lever laterally and a motor for operating said lever longitudinally, and means for controlling the operation of said motors comprising a plurality of valve units, and electrical means for operating said valves comprising a manually operable selector switch, a selector switch rendered operable with the longitudinal operation of said lever means, and another selector switch rendered operable with the lateral operation of said lever means.

23. Power operated mechanism for an automotive transmission having two shift rails and an operating lever therefor and comprising, in combination therewith, a power unit for operating said lever member including a cross-shifting motor for operating said lever laterally and a shift motor for operating said lever and its connected rail longitudinally, control valve means for said motors, and electrical means for controlling the operation of said valve means, said electrical means comprising a selector switch having a manually operable member, movable to pre-select various gear relations, a neutralizing switch operably connected to said shift motor, another switch operably connected to the cross-shaft motor, and conductors interconnecting said switches, the latter being operable, when the aforementioned manually operable member is positioned to pre-select high or second gear, and the transmission is established in either low or reverse gear, to in part establish a circuit, to insure initiation of the neutralizing operation of said shift cylinder as a prerequisite to a subsequent establishment of a circuit to effect either a high or second gear operation of said shift cylinder.

MAURICE LEMPEREUR.
CHARLES VINCENT.